Dec. 3, 1940.  N. J. CHRISTMAN  2,223,552
SAFETY PIN AND THE LIKE
Filed July 5, 1940
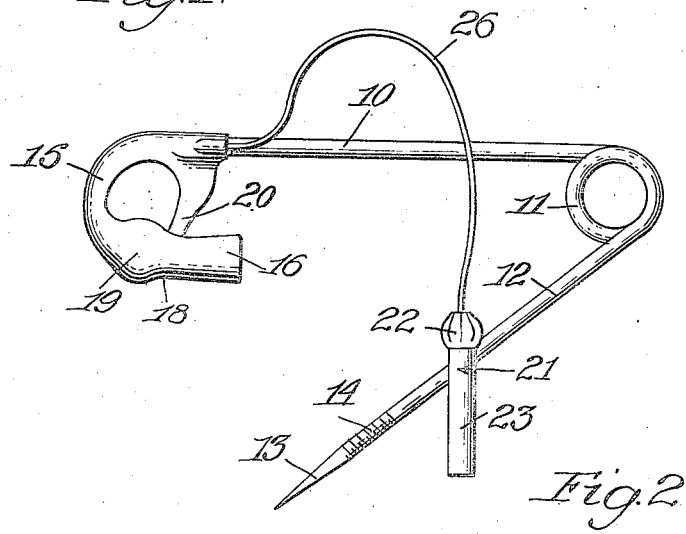
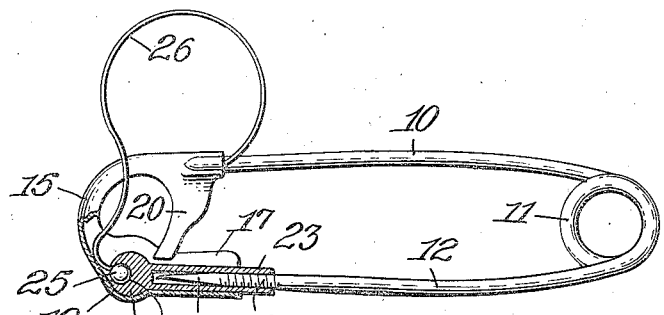
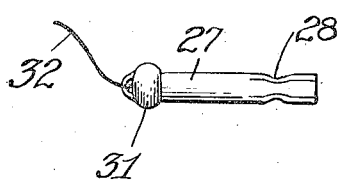
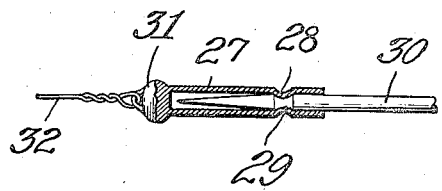
Inventor:
Norbert J. Christman,
By Dawson, Ooms & Booth,
Att'ys Patented Dec. 3, 1940

2,223,552

UNITED STATES PATENT OFFICE 2,223,552

SAFETY PIN AND THE LIKE

Norbert J. Christman, Green Bay, Wis.

Application July 5, 1940, Serial No. 344,022

9 Claims. (Cl. 24—56)

This invention relates to a safety pin or the like.

An object of the invention is to provide a safety pin which will offer a maximum of protection against pricking with the point of the pin and against coming open after being closed in use.

The safety pins in common use are subject to the objection that when the materials pinned come under strain and tend to pull the ends of the pin apart, the back of the pin yields, allowing the point of the pin to be pulled from the hook or safety catch. This is one of the objections which the invention is intended to overcome.

A more specific object of the invention is to provide a safety pin which has a guard for placing over the point of the pin, the guard being utilized not only for protecting against injury from the pin point but also for locking the pin in closed position. Still another object is to provide such a guard-equipped pin in which the guard is tied to the pin to prevent loss but is yet capable of being screwed onto the point portion of the pin. Other objects and advantages of the invention will become apparent as the specification proceeds.

The invention is illustrated in the accompanying drawing, in which—

Figure 1 is a perspective view of one embodiment showing the pin in open position with the guard removed and showing the guard member in section; Fig. 2, a front view of the pin shown in Fig. 1 but in closed position with the guard affixed, and having the fore part of the hook member cut away to show more clearly how the guard is nested in the hook member; Fig. 3, a detail view showing a modified form of guard which may be employed in the improved pin; and Fig. 4, a side view in elevation of the form of guard shown in Fig. 3.

As illustrated, my improved safety pin includes the back 10 which at its rear end is coiled in the loop 11. The other end of loop 11 extends forwardly to form the pin member 12 which ends in the sharp point 13. Near the point of pin 12 is a threaded portion 14 which has threads of a rounded character so that as the pin is pushed through fabrics the threads will not catch or tear the goods. The back 10, loop 11 and pin 12 may all be a single piece of wire.

Attached to the forward end of the back 10 is a hook member 15 formed of a piece of metal which is crimped closely about the wire 10. Member 15 is bent in the form of a hook, the backwardly turned part 18 having the two side lips 16 and 17. At the fore part of portion 18 there is an expanded portion 19 which provides a socket for the knob of the guard later to be described.

Extending laterally from the back toward the center of the hook portion 18 is a guide 20 which serves to direct the pin with the attached guard into the proper closed position. As will later appear more clearly, this guide also helps in locking the guard within the hook member and in preventing accidental opening of the safety pin.

The guard 21, as shown in Figs. 1 and 2, has a knob 22 of spherical shape from which is a tubular extension 23 provided with interior threads. The end of knob 22 has a cavity 24 in which is a swivel head 25 attached to one end of the tie wire 26. The other end of the tie wire 26 is attached with the member 15 to the back of the pin.

In operation the improved pin, in the condition shown in Fig. 1, is manipulated to push the pin member 12 through the fabric or other material to be pinned; and when the point portion of the pin is through the goods, the guard 21 is screwed over the point, the interior threads of the guard engaging the exterior threads on the pin member. Rotation of the guard is permitted without twisting the tie wire 26, since the swivel head 25 is free to turn within the cavity 24.

With the guard received over the pin point, the pin member 12 may then be urged against the spring of coil 11 to bring the guard 21 over the fore lip 16 and, directed by guide 20, lodged in position between the lips 16 and 17 of the hook member 18. Thus closed, the knob or ball 22 rests within the socket 19 and the end of guide 20 is disposed just forward of the knob.

Once closed in this way, it will be apparent that the guard is secured to the pin member and is locked against forward or backward movement with respect to the hook member. The guard is locked against such movement in one way through engagement of the knob 22 with the socket 19 in the hook member, and this engagement effectively prevents the point of the pin being pulled, through strain of the pinned material, rearwardly endwise out of the hook member. A second locking means is the engagement between the end of guide 20 with the knob 22 as the pin member is attempted to be pulled rearwardly.

It will be apparent that my invention is not limited to any of the specific forms or structures shown, and the improved device has many variations. For example, the knob or expanded portion 22 as shown in Figs. 1 and 2 may be elliptical or square or other shape instead of spherical, the socket in the hook member being formed to fit. The hook member 18 also may take one of a countless number of forms, it being essential only that there be structure to catch and hold the pin member in closed position and to provide the locking engagement for the guard.

A modified form of guard is illustrated in Fig. 3 of the drawing. This form of guard has the tubular portion 27 which is split so as to provide an expansible interior. Portion 27 is provided with the depressions 28 which protrude inwardly and are adapted to engage the groove 29 in the pin member 30 to maintain the guard in place over the pin. This form of guard is advantageous because of its convenience of attachment and removal and also since it does not require that the pin member be cylindrical in shape. Though this guard can easily be removed when the safety pin is open merely by pulling it off the end of the pin, it is securely locked against such removal when the safety pin is closed, since engagement with the hook member maintains the sections of the guard together preventing the depressions 28 from disengagement from the groove 29.

Attached at the end of portion 27 is the knob 31 to which is attached the end of the tie wire 32. It will be observed that no swivel arrangement is necessary with this type of attachment onto the pin point. The tie 32, may, if desired, be of other suitable material instead of wire.

The foregoing detailed description has been given for clearness of understanding only, and not in a limiting sense, it being understood that the improved structure can take many forms and is subject to wide variation, all within the spirit of the invention.

I claim:

1. A safety pin comprising a back having attached thereto a hook member, a pin in resilient relation with said back, and a guard member adapted to receive the point portion of said pin and equipped with means of attachment to said pin, said guard member being received, when the safety pin is in closed position, into interlocking engagement with said hook member, thereby to prevent movement of the hook member off the point of the pin.

2. A safety pin comprising a back having attached thereto a hook member, a pin in resilient relation with said back and provided at its point portion with exterior threads, and a guard member provided with interior threads and adapted to engage the threaded portion of said pin, said guard member being receivable into interlocking engagement with said hook member, thereby to prevent movement of the hook member off the point of the pin.

3. A safety pin comprising a back having attached thereto a hook member containing a socket therein, a pin in resilient relation with said back, and a guard member provided with means for releasably engaging said pin to cover the point thereof, said guard member having a knob thereon which is received into said socket when the safety pin is in closed position, thereby to lock said hook member from movement off the point of said pin.

4. In a safety pin of the character set forth, a pin member having a point thereon, a guard releasably attachable to said pin member for covering the point of the pin, and a hook member into which said guard member may move laterally into an engagement which locks the pin and hook members against inter-movement longitudinally of the pin.

5. A safety pin comprising a pin member having a point thereon, a guard releasably attachable to said pin member and adapted to cover the point of the pin, said guard having an enlargement thereon, and a hook member into which said enlargement may move laterally upon closing of the pin, said hook member being constricted back of said enlargement so that the constriction engages said enlargement to prevent movement of the hook member toward the point of the pin.

6. A safety pin comprising a hook member, a pin member, a guard receivable over the point of said pin member, said guard being receivable laterally into interlocking engagement with said hook member, and means connecting said guard with the safety pin to prevent the guard's becoming lost from the pin.

7. A safety pin comprising a hook member, a pin member threaded exteriorly at its point portion, a guard interiorly threaded and receivable over said point portion in threaded engagement, said guard being receivable laterally into interlocking engagement with said hook member, and means connecting said guard with the safety pin to prevent the guard's becoming lost from the pin, said guard being rotatably attached to said means so as to permit free movement of the guard into threaded engagement with the pin.

8. A safety pin comprising a back having attached thereto a hook member, a pin in resilient relation with said back, a guard adapted to receive the point portion of said pin and equipped with means of attachment to said pin, said guard being receivable into interlocking engagement with said hook member when the safety pin is in closed position, and a guide member for directing said guard into such engagement when the pin is closed, said guide member being engageable with said guard to prevent backward movement of the pin out of its position in the hook member.

9. A safety pin comprising a back having attached thereto a hook member, a pin in resilient relation with said back, and a guard adapted to be received over the point portion of said pin, said guard and pin having means for releasable engagement, said guard being receivable into interlocking engagement with said hook member, thereby to prevent movement of the hook member off the point of the pin, the engagement between said hook member and said guard being such as to lock said guard against disengagement from said pin.

NORBERT J. CHRISTMAN.